US008616512B2

(12) United States Patent
McMath et al.

(10) Patent No.: US 8,616,512 B2
(45) Date of Patent: Dec. 31, 2013

(54) MULTI-PURPOSE CABLE SUPPORT HAVING BENDABLE STEM

(75) Inventors: Justin C. McMath, Evanston, IL (US); Asim Siddiqui, Elgin, IL (US); Anthony Caringella, Norridge, IL (US); Tom Colangelo, Lombard, IL (US)

(73) Assignee: Illinois Tool Works Inc., Glenview, IL (US)

( * ) Notice: Subject to any disclaimer, the term of this patent is extended or adjusted under 35 U.S.C. 154(b) by 328 days.

(21) Appl. No.: 12/888,592

(22) Filed: Sep. 23, 2010

(65) Prior Publication Data

US 2012/0074268 A1    Mar. 29, 2012

(51) Int. Cl.
*F16B 45/00*    (2006.01)

(52) U.S. Cl.
USPC .......................................... 248/308; 248/304

(58) Field of Classification Search
USPC .............. 248/690, 691, 692, 215, 227.1, 301, 248/303, 304, 305, 308, 339, 909; 211/106.01
See application file for complete search history.

(56) References Cited

U.S. PATENT DOCUMENTS

| 4,039,131 | A | | 8/1977 | Perrault et al. | |
|---|---|---|---|---|---|
| 4,333,625 | A | * | 6/1982 | Haug | 248/216.1 |
| 4,709,888 | A | * | 12/1987 | Cubit et al. | 248/73 |
| 5,386,959 | A | | 2/1995 | Laughlin et al. | |
| 5,740,994 | A | | 4/1998 | Laughlin | |
| 5,961,081 | A | | 10/1999 | Rinderer | |
| 6,247,675 | B1 | * | 6/2001 | Askin | 248/214 |
| 6,332,594 | B2 | | 12/2001 | Shelton et al. | |
| 6,364,260 | B1 | * | 4/2002 | Lorincz et al. | 248/215 |
| 6,565,048 | B1 | * | 5/2003 | Meyer | 248/58 |
| 6,622,858 | B1 | * | 9/2003 | Wilkinson et al. | 206/299 |
| 2005/0072886 | A1 | * | 4/2005 | Adams | 248/301 |

* cited by examiner

*Primary Examiner* — Alfred J Wujciak
(74) *Attorney, Agent, or Firm* — Greer, Burns & Crain, Ltd.; Patty Chidiac; Mark W. Croll

(57) ABSTRACT

A cable support has a body formed from a strap of self-supporting material, with a hook portion having a free end and an opposite attachment end. A stem is formed by the attachment end and includes an end segment movable relative to a main segment between a first, linearly-aligned position, and a second, normally-oriented position for facilitating selective mounting of the support on vertical and horizontal substrates.

12 Claims, 3 Drawing Sheets

MULTI-PURPOSE CABLE SUPPORT HAVING BENDABLE STEM

BACKGROUND

The present invention relates generally to substrate-mounted supports for cable, electrical wiring and the like, and more specifically to a support having features for facilitating the mount of the support to a variety of substrates, for facilitating removal of the support when a fastener is misaligned or improperly driven or located, and for facilitating gripping of the support to the substrate.

Data or communications cables are commonly installed by attachment to supporting structures such as beams, rods, ceilings or walls using cable supports. Since the cables are installed during construction of a finished commercial or residential establishment, the cable support is typically attached to rough support structures which are eventually covered by ornamental wallboard, paneling, ceiling tile, or the like.

Conventional cable supports are typically "J"-shaped, including a hook portion dimensioned to accommodate a wrapped bundle of cables, and a generally vertically extending stem projecting from the hook portion. Such cable supports are typically fabricated from a single length of steel which is then formed or stamped into the desired shape. Since cable ties are typically employed to secure bundles of cable to a particular cable support, such supports often have stamped openings for accommodating such ties. Prior to installation of the cable ties, the bundles of cable are slidably engaged in the hook portion of the cable support, as is common during installation of cable. Once the cables are properly positioned, the cable ties are installed, with care taken to avoid damaging the cable by cinching the ties too tightly.

Installers of such cables on cable supports need to avoid crimping, kinking, bending or otherwise damaging the cable to be supported. It has been found that such mishandling results in poor cable performance in the form of poor data or voice signal transmission.

SUMMARY

The present cable support addresses the following problems of conventional supports. First, conventional cable supports are typically designed for attachment to a vertical-facing substrate such as a side of a beam or joist. Such cable supports are awkward or unable to effectively attach to a horizontal substrate, such as a concrete ceiling or a horizontal surface on a joist. The present cable support addresses this problem by providing a stein with a bendable end segment which is movable from a first, vertical position to a second, horizontal position oriented normally to the stem. Stop formations along edges of the stem support and hold the end segment in its angled, second position.

Another drawback is that such cable supports are difficult to remove from the substrate when the fastener used to secure the support to the substrate has been misaligned, inaccurately positioned or otherwise incorrectly installed. The present cable support provides a fastener removal channel with a malleable locking tab constructed and arranged for being deformed by a user to enable disengagement of the cable support from a fastener driven in to the substrate. Still another drawback of conventional cable supports is the tendency to rotate about the fastener used to anchor the support to the substrate. In the present support, this problem has been addressed by adding friction-enhancing formations or projections which grip the substrate to prevent unwanted rotation.

More specifically, the present invention provides a cable support, having a body formed from a strap of self-supporting material, having a hook portion having a free end and an opposite attachment end. A stem is formed by the attachment end and includes an end segment movable relative to a main segment between a first, linearly-aligned position, and a second, normally-oriented position for facilitating selective mounting of the support on vertical and horizontal substrates.

In another embodiment, a cable support is provided, and includes a J-shaped body formed from a strap of self-supporting material, having a hook portion having a free end and an opposite attachment end. A fastener removal channel is formed in the body, and has a malleable locking tab constructed and arranged for being deformed by a user to enable disengagement of the cable support from a fastener driven in to the substrate.

In still another embodiment, a cable support is provided, and includes a body formed from a strap of self-supporting material and having a hook portion having a free end, and an opposite attachment end. A stem is formed by the attachment end and includes at least one gripping formation for enhancing frictional engagement between the body and a corresponding substrate. Each gripping formation is a stamped tab projecting from a rear surface of the body.

DETAILED DESCRIPTION

Figure 1:
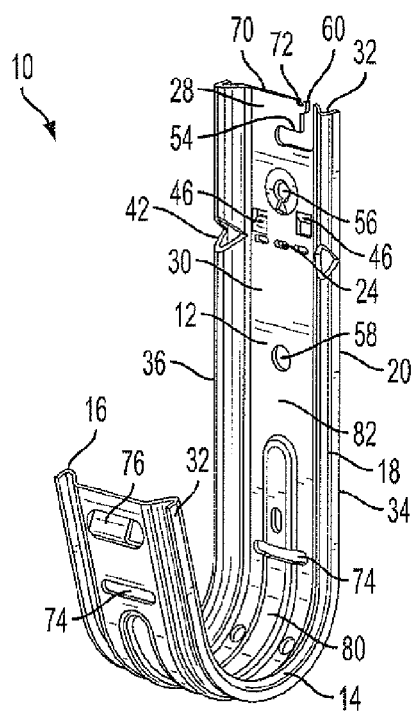
FIG. 1 is a front perspective view of the present cable support.

Referring now to FIG. 1, the present cable support is generally designated 10, and is made of a body 12, preferably an elongate strip or strap of sheet metal, steel or other self-supporting material. In the preferred embodiment, the body 12 is cut, stamped and/or formed using conventional metal forming techniques for achieving the desired shape described in greater detail below.

Figure 5:
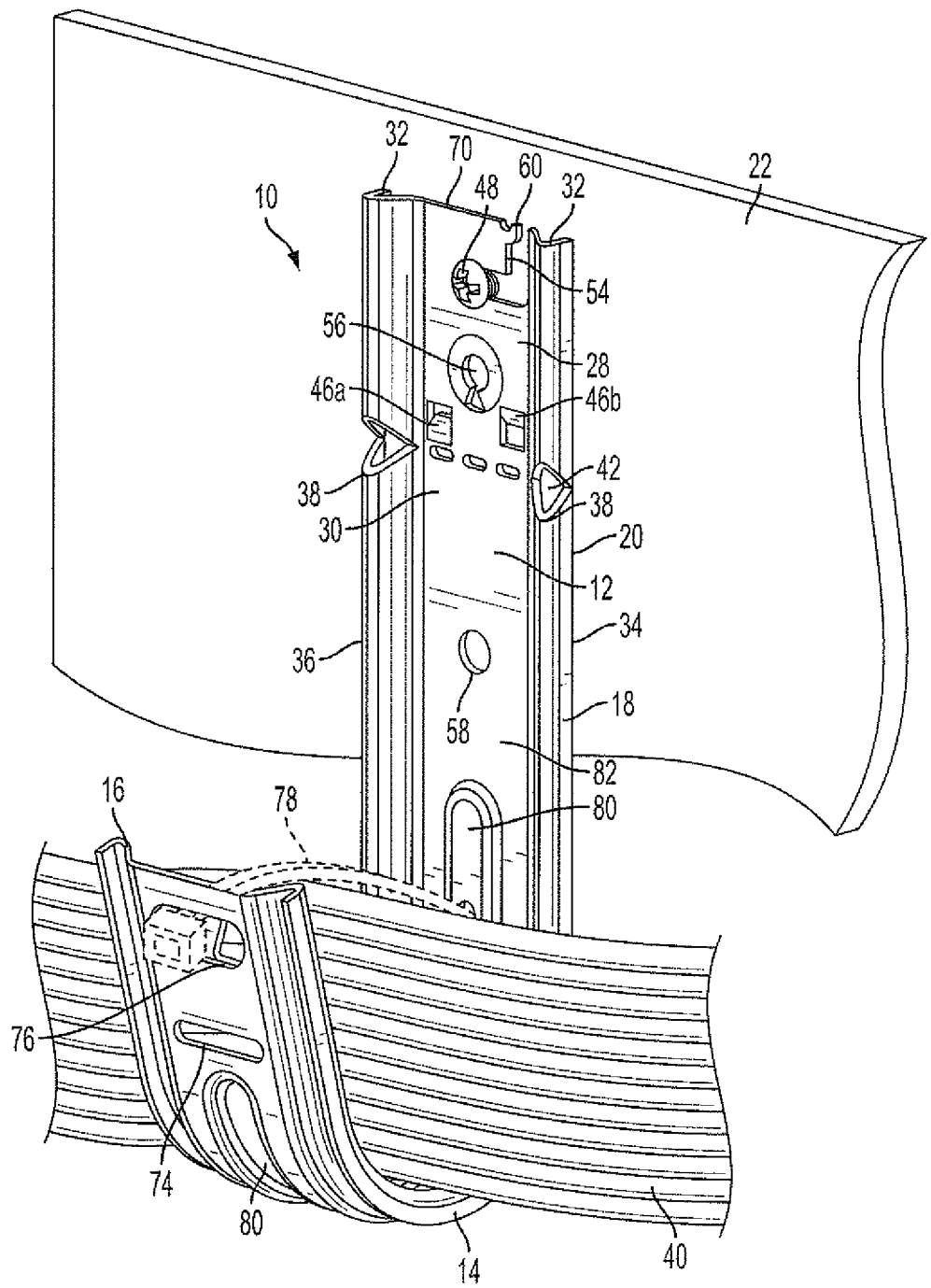
FIG. 5 is a front perspective view of the present cable support shown mounted to a substrate and carrying a bundle of cables.

The cable support 10 is generally "J"-shaped, with the body 12 forming a generally "U"-shaped hook portion 14 having a free end 16. Opposite the free end 16, the hook portion 14 transitions into an attachment end 18 forming a stem 20. It is the stem 20 that attaches to a substrate 22 (FIG. 5). In the preferred embodiment, the body 12 is unitary and the hook portion 14 and the stem 20 are integrally formed in the body from a single strap of metal. While in many the cases, the substrate 22 will be a vertical or generally vertical surface, an advantage of the present cable support 10 is that it is constructed and arranged to maintain the hook portion 14 in operational alignment as seen in FIG. 5 whether the substrate 22 is vertical or horizontal. Typical horizontal substrates are ceilings and undersides of horizontal beams or joists, made of concrete, wood or the like.

Figure 2:
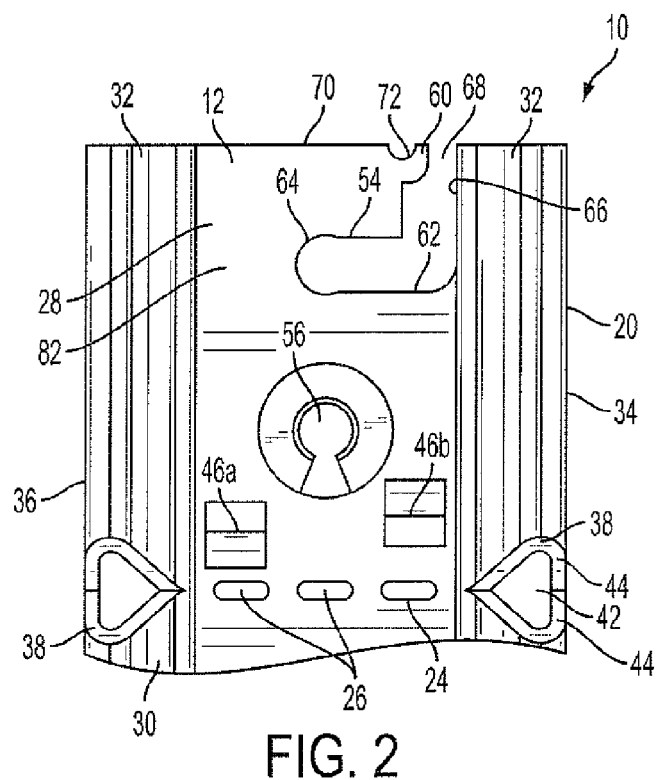
FIG. 2 is an enlarged fragmentary front elevation of the support of FIG. 1.

More specifically, referring now to FIGS. 1 and 2, the stem 20 has a transverse bend line 24, preferably shown as a linear arrangement of spaced elongate slots 26. However, other techniques for creating a hinge or bend line, such as scoring or notching are contemplated for forming the bend line 24. The bend line 24 defines the stem 20 into an end segment 28 and a main segment 30, and serves as a hinge point in pivoting action of the end segment, described below. In the preferred embodiment, the end segment 28 is located in the stem 20, and is relatively shorter in length than the main segment 30, however the relative dimensions may change to suit the application.

The body 12 is provided with at least one and preferably a pair of support corrugations or ribs 32 that extend along each lateral edge 34, 36 of the body. It is contemplated that the corrugations 32 extend in spaced, parallel orientation to each other for the full length of the body 12 from the free end 16 to the end segment 28, but their orientation and configuration may vary to suit the application. The corrugations 32 add structural stiffness and rigidity to the body 12, and they also include a radiused apex 38 (FIG. 2) for enhancing lateral sliding action of cables 40 (FIG. 5) placed in the hook portion 14 once the cable support 10 is operational. Such sliding action reduces the chances of damage, kinking or twisting of the cables 40.

Figure 3:
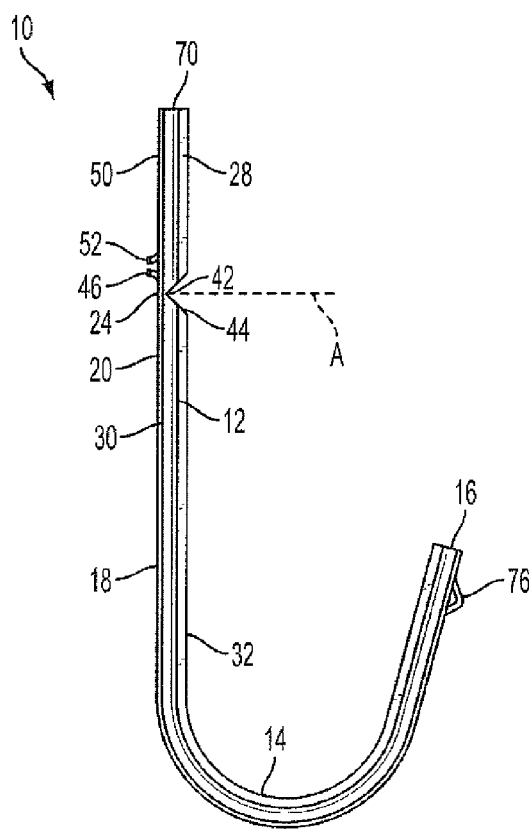
FIG. 3 is a side elevation of the present cable support configured for mounting to a vertical substrate.
Figure 4:
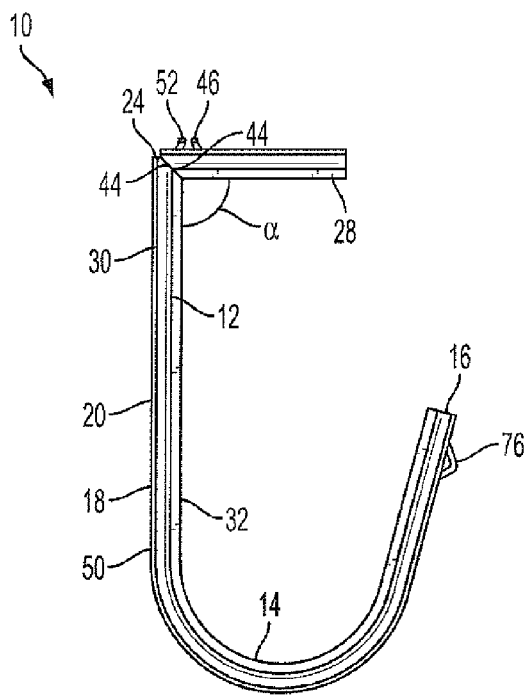
FIG. 4 is a side elevation of the cable support of FIG. 3 configured for mounting to a horizontal substrate.

Referring now to FIGS. 1-4, an advantage of the present cable support 10 is that the end segment 28 is movable about the bend line 24 relative to the main segment 30 between a first, linearly aligned position (FIG. 3), and a second, normally oriented position (FIG. 4) for facilitating selective mounting of the support respectively on vertical and horizontal substrates 22. This pivoting, hinged movement of the end segment 28 is facilitated by a hinge recess 42 in each support corrugation 32 aligned with the bend line 24 for enabling the end segment 28 to bend to a designated angle α (FIG. 4) relative to the main segment 30. While in the present embodiment the angle α is 90°, other angles may be suitable, depending on the desired orientation of the hook portion 14 relative to the substrate 22. It will be seen that the hinge recess 42 is generally "V"-shaped when seen from the side (FIG. 3), which each side 44 of the "V" oriented at 45° relative to an axis "A" transverse to a plane defined by the stem 20. Upon the end segment 28 bending about or on the bend line 24, the right angle α is defined between the end segment and the main segment 30 (FIG. 4). Contact between the sides 44 of the recesses 42 acts as a stop and prevents further angular movement of the end segment 28 relative to the main segment 30.

Referring now to FIGS. 1 and 2, at least one gripping formation 46 is provided to the body 12 for enhancing frictional engagement between the body and the corresponding substrate 22. The purpose of the gripping formation 46 is to prevent unwanted rotation of the cable support 10 relative to a fastener 48 (FIG. 5) used to secure the support to the substrate. Such unwanted rotation causes the hook portion 14 to misalign and thus prevents full, designed support by the hook portion 14 to the cables 40.

While other locations on the body 12 are contemplated, it is preferred that the gripping formations 46 are located on the end segment 28 of the stem 20. Further, the gripping formations 46 are tabs that are stamped from the body 12 and bent backward to project from a rear surface 50 of the body (FIGS. 3 and 4). More preferably, the cable support 10 has a pair of such tabs 46a and 46b (FIG. 2) cut from adjacent locations on the body 12 and having free edges 52 that are the fracture point where the tab is cut from the body. The free edges 52 ultimately engage the substrate 22. While rectangular tabs 46a, 46b are shown, it will be understood that the specific shape of the tabs may vary to suit the application.

Referring now to FIGS. 1, 2 and 5, the body 12 of the cable support 10 has at least one aperture 54, 56, 58 for use in securing the support to the substrate, preferably by using the fastener 48, such as a threaded fastener or a fastener pin driven by a powder-activated or combustion tool or the like. As is known in the art, the type of fastener 48 is determined by the composition of the substrate. It will be understood that regardless of the type of aperture 54-58, the fastener 48 passes through the corresponding apertures and subsequently engages the substrate 22 as is known in the art. In addition, in the present cable support 10, the respective apertures 54-58 have specialized applications.

When the substrate 22 is concrete, the preferred fastener 48 is a drive or fastener pin specially constructed for penetrating and holding in concrete. As such, in situations when the user misaligns the pin or there is some malfunction resulting in the cable support 10 being improperly positioned, it is very difficult to extract the pin. In conventional cable supports, this means that the support must remain on the substrate and is wasted if its position is unacceptable. The alternative is to destroy the support in the process of removing it.

However, an advantage of the present cable support 10 is that the aperture 54 is a removal channel with a malleable locking tab 60. The channel 54 is preferably "L"-shaped, with a generally horizontal leg 62 having a closed end 64, and a vertical leg 66 having an open end 68 adjacent an upper edge 70 of the stem 20. While other locations on the body 12 are contemplated, the channel 54 is located on the stem 20.

The malleable locking tab 60 is integral with the body 12 and projects into or across the open end 68 to maintain the support 10 in position when the fastener 48 is properly driven. In the preferred embodiment, the locking tab 60 is flush with the upper edge 70 of the body 12. Preferably, the locking tab 60 is partially defined by a recess 72 along the upper edge 70 for facilitating deformation. When the fastener 48 is improperly driven, the locking tab 60 is constructed and arranged for being deformed by a user to allow movement of the tab for enabling disengagement of the cable support 10 from a fastener driven in to the substrate. While sufficiently strong to secure the support 10 to the substrate during normal operation, the tab 60 can be readily bent away from the open end 68 to allow the support 10 to be disengaged from the corresponding fastener 48 and removed from the substrate 22.

Similar to the aperture 54, the other apertures 56 and 58 also each have a specialized function. The aperture 56 is threaded on an internal diameter to accommodate a threaded rod of the type typically used to suspend ceiling brackets, pipe brackets and the like from a ceiling in new construction. Alternately, the aperture 56, as well as the unthreaded, generally circular aperture 58, may also be used for attachment of the cable support 10 to the substrate or to other brackets or hangers using fasteners as is known in the art.

Referring now to FIGS. 1 and 5, in addition to the above-listed features, the present cable support 10 includes at least one tie strap pass through slot 74, at least one tie clip receiver 76 for use in securing the cables 40 to the support, preferably receiving a cable tie 78 (shown in phantom) as is known in the art. Further, the hook portion 14 is preferably provided with an optional raised boss 80 for enhancing support of the cables 40. While a variety of configurations are contemplated, the boss is also elongate and "J"-shaped when viewed from the side, and is centrally located in a planar web portion 82 of the body 12.

Thus, it will be seen that the present cable support 10 addresses many of the drawbacks of conventional products. The present support 10 is mountable to both vertical and horizontal surfaces using the bendable end segment 28. In addition, if a fastener is misaligned or improperly positioned, the malleable locking tab 60 can be deformed to permit release of the support 10 from the substrate 22. Further, the frictional engagement of the support 10 to the substrate 22 is enhanced by the gripping formations 46.

While a particular embodiment of the multi-purpose cable support having a bendable stem has been described herein, it will be appreciated by those skilled in the art that changes and modifications may be made thereto without departing from the invention in its broader aspects and as set forth in the following claims.

The invention claimed is:

1. A cable support for suspending cable on a support structure, comprising:
    a body formed from a strap of self-supporting material and having a hook portion having a free end, and an opposite attachment end;
    a stem formed by said attachment end and including an end segment movable relative to a main segment between a first, linearly aligned position, and a second, normally oriented position for facilitating selective mounting of said support on vertical and horizontal substrates;
    a transverse bend line defining said end segment and said main segment of said stem, and forming a hinge point of movement of said end segment between said first and second positions; and
    at least one support corrugation on said body provided with a hinge recess aligned with said bend line for enabling said end segment to bend to a designated angle relative to said main segment.

2. The cable support of claim 1, wherein said bend line is defined by a plurality of linearly spaced slots arranged end-to-end on said stem.

3. The cable support of claim 1, further including a pair of said support corrugations disposed in generally spaced parallel orientation on said body and extending from said free end of said hook to said end segment.

4. The cable support of claim 1, wherein each said hinge recess has a pair of sides oriented at an approximate 45° angle to an axis transverse to a plane defined by said stem, so that upon said end segment bending on said bend line, a right angle is defined between said end segment and said main segment.

5. The cable support of claim 1, further including at least one gripping formation for enhancing frictional engagement between said body and a corresponding substrate surface; each said gripping formation projecting obliquely and at least one of upward and downward from a rear surface of said body toward the corresponding substrate surface.

6. The cable support of claim 5, wherein said at least one gripping formation is a stamped tab.

7. The cable support of claim 5, wherein said at least one gripping formation is located on said stem.

8. The cable support of claim 7, wherein said stem has an end segment, and said at least one gripping formation is located on said end segment.

9. The cable support of claim 1, further including a fastener removal channel with a malleable locking tab constructed and arranged for being deformed by a user to enable disengagement of said cable support from a fastener driven in to the substrate.

10. The cable support of claim 9, wherein said fastener removal channel is generally "L"-shaped and defines an opening in an upper edge of said stem, said locking tab being located adjacent said opening.

11. The cable support of claim 9, wherein said locking tab is dimensioned to be generally flush with an upper edge of said stem.

12. A cable support for suspending cable on a support structure, comprising:
    a body formed from a strap of self-supporting material and having a hook portion having a free end, and an opposite attachment end;
    a stem formed by said attachment end and including at least two gripping formations for enhancing frictional engagement between said body and a corresponding substrate surface;
    at least one aperture on said stem constructed and arranged to accommodate a fastener for mounting said cable support to said substrate;
    said at least two gripping formations each being a stamped tab projecting from a rear surface of said body, each said gripping formation projecting obliquely and at least one of upward and downward from a rear surface of said body toward the corresponding substrate surface, a first of said gripping formations projecting asymmetrically to a second of said gripping formations relative to said at least one aperture for preventing unwanted rotation of said cable support; and
    said stem has an end segment movable relative to a main segment between a first, linearly aligned position, and a second, normally oriented position for facilitating selective mounting of said support on vertical and horizontal substrates, and said at least one gripping formation is located on said end segment.

* * * * *